(12) United States Patent
Hiruma et al.

(10) Patent No.: US 8,335,136 B2
(45) Date of Patent: Dec. 18, 2012

(54) OPTICAL PICKUP APPARATUS

(75) Inventors: Mitsuhiro Hiruma, Kiryu (JP); Chiaki Asakawa, Gunma (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 13/219,093

(22) Filed: Aug. 26, 2011

(65) Prior Publication Data

US 2012/0051205 A1 Mar. 1, 2012

(30) Foreign Application Priority Data

Aug. 30, 2010 (JP) ................................. 2010-191944

(51) Int. Cl.
*G11B 7/00* (2006.01)
(52) U.S. Cl. .................... 369/44.24; 369/44.37
(58) Field of Classification Search ............... 369/44.42, 369/44.41, 44.32, 44.23, 44.24, 44.37, 120, 369/112.01
See application file for complete search history.

(56) References Cited

U.S. PATENT DOCUMENTS 7,639,591 B2 * 12/2009 Shindo .......................... 369/118
7,965,594 B2 * 6/2011 Nakamura et al. .......... 369/44.37

FOREIGN PATENT DOCUMENTS

JP 4-168631 6/1992

* cited by examiner

*Primary Examiner* — Nabil Hindi
(74) *Attorney, Agent, or Firm* — Morrison & Foerster LLP

(57) ABSTRACT

Provided is an optical pickup apparatus using a reduced number of parts. An optical pickup apparatus (26) of the present invention includes: a laser unit (108) for emitting a laser beam complying with the BD standards; a laser unit (106) for emitting a laser beam complying with the DVD standards and a laser beam complying with the CD standards; and a PDIC (10B) for receiving and detecting the laser beams complying with the respective standards. Because the laser beam complying with the DVD standards and the laser beam complying with the BD standards are received by one photo detector provided in the PDIC (10B), the number of parts needed for the optical pickup apparatus (26) can be reduced, and the costs of the apparatus can be decreased.

11 Claims, 7 Drawing Sheets

(A)

(B)

(A)

(B)

OPTICAL PICKUP APPARATUS

This application claims priority from Japanese Patent Application Number JP 2010-191944 filed on Aug. 30, 2010, the content of which is incorporated herein by reference in its entirety.

BACKGROUND OF THE INVENTION

1. Field of the Invention

The present invention relates to an optical pickup apparatus. In particular, the present invention relates to an optical pickup apparatus using a reduced number of parts.

2. Description of the Related Art

In these days, CDs (compact discs), DVDs (digital versatile discs) and the like are widely in use as optical disc media for information recording/reproduction. In order to record/reproduce information in an optical disc medium, a laser beam to be collected by an objective lens needs to be precisely focused on an information recording layer included in the optical disc medium. To this end, some controls are performed. Examples of the controls include: a focusing control for correcting an error which takes place when the laser beam is out of focus on the information recording layer in the optical disc medium; and a tracking control for correcting an error which takes place when a spot of the laser beam collected on the information recording layer deviates from a predetermined track center.

Well-known examples of the focusing control include a focusing control employing a differential astigmatism method. The focusing control employing the differential astigmatism method is performed as follows. First of all, the laser beam is diffracted by use of a diffraction grating or something similar. Thus, a zero-order beam, a plus first-order beam and a minus first-order beam are produced. Subsequently, the zero-order, plus first-order and minus first-order beams are cast on the information recording layer in the optical disc medium. Reflecting beams, which are the zero-order, plus first-order and minus first-order beams reflected off the information recording layer, are subjected to astigmatism by a cylindrical lens or something similar. The reflecting beams of the zero-order, plus first-order and minus first-order beams, which have been subjected to the astigmatism, are received by three quadrant photo-detectors provided in a photo-detecting device.

Referring to FIG. 7A, a first light receiving region 211, a second light receiving region 212, and a third light receiving region 213 are placed in a PDIC (photo detector integrated circuit) used for the differential astigmatism method. The zero-order, plus first-order, and minus first-order diffracted beams are received by these light receiving regions. In this respect, the first light receiving region 211 is formed from light receiving portions A', B', C', D'; the second light receiving region 212 is formed from light receiving portions E', F', G', H'; and the third light receiving region 213 is formed from light receiving portions I', J', K', L'.

This drawing indicates shapes, which the laser beam cast on the light receiving regions takes on when the zero-order beam is focused on the information recording layer in the information recording medium, with circles drawn by chain lines. When the zero-order beam is focused on the information recording layer in the information recording medium, the light reception pattern of the reflecting zero-order beam is circular, and the reflecting zero-order beam is cast on the light receiving portions A' to D' equally. Similarly, the light reception pattern of the reflecting plus first-order beam is circular, and the reflecting plus first-order beam is cast on the light receiving portions E' to L' equally. Similarly, the light reception pattern of the reflecting minus first-order beam is circular, and the reflecting minus first-order beam is cast on the light receiving portions E' to H' equally.

In addition, this drawing indicates shapes, which the laser beam cast on the light receiving regions takes on when the zero-order beam is not focused on the information recording layer in the information recording medium, with dashed lines. When the zero-order beam is out of focus on the information recording layer in the information recording medium, the light reception patterns of each of the reflecting zero-order, plus first-order and minus first-order beams are ellipses whose major axes are diagonals of the corresponding light receiving portions A' to D', E' to H', or I' to L'. Accordingly, the reflecting zero-order, plus first-order and minus first-order beams are not cast on the light receiving portions A' to L' equally. The light reception patters of this case are indicated with dashed lines.

On the basis of outputs from the respective light receiving portions A' to L', a focus error signal (hereinafter referred to as an "FE signal") is produced by performing arithmetic on a mathematical expression of {(an output from the light receiving portion A'+an output from the light receiving portion C')−(an output from the light receiving portion B'+an output from the light receiving portion D')}+k[{(an output from the light receiving portion I'+an output from the light receiving portion K')−(an output from the light receiving portion J'+an output from the light receiving portion L')}+{(an output from the light receiving portion E'+an output from the light receiving portion G')−(an output from the light receiving portion F'+an output from the light receiving portion H')}], where reference sign k denotes a ratio of the light intensity of the zero-order beam to the light intensities of the respective plus and minus first-order beams. On the basis of the thus-obtained FE signal, the focusing control is performed. Thereby, the zero-order beam can be focused on the information recording layer in the optical disc media.

In these years, two-layered optical disc media each having two information recording layers are widely in use as the optical disc media. As shown in FIG. 7B, a two-layered optical medium (a disc 200) has a structure in which a base layer having a first information recording layer 200A formed as a first layer is adhered to a base layer having a second information recording layer 200B formed as a second layer, with an intermediate layer interposed in between. The first information recording layer 200A is formed from a translucent reflection film; reflects parts of the respective total quantities of the zero-order beam, the plus first-order beam, and the minus first-order beam; and transmits the rests of the respective total quantities of the zero-order beam, the plus first-order beam, and the minus first-order beam. The second information recording layer 200B is formed from a reflection film, and reflects the zero-order, plus first-order and minus first-order beams from the first information recording layer 200A. In addition, the focusing control is similarly performed on this multi-layered disc 200 for the purpose of focusing the zero-order beam on each of the information recording layers 200A, 200B. This technology is described, for instance, in Japanese Patent Application Publication No. Hei 4-168631.

In the two-layered optical disc media, it is likely, for example, that when the laser beam (the zero-order beam) is focused on the first information recording layer 200A, the reflecting zero-order beam reflected off the second information recording layer 200B may be cast on the light receiving portions I', G', which are expected to receive the reflecting plus first-order beam and the reflecting minus first-order beam, respectively. The hatched area shown in FIG. 7A indicates the area on which the zero-order beam (stray light) reflected off the second information recording layer 200B shown in FIG. 7B is cast.

Once this phenomenon takes place, the outputs from the light receiving portions I', G' become greater than their respective expected values, and the focus servo operation using the differential astigmatism method is hindered from being performed appropriately. Particularly, in a case where the light intensity of the zero-order beam is greater than the light intensities of the respective plus and minus first-order beams (in other words, in a case where the value represented by reference sign k is larger), the outputs from the light receiving portions I', G' are amplified by a high gain. For this reason, this problem becomes conspicuously serious.

Furthermore, in a case where the pickup apparatus performs a reading operation and the like on a disc complying with the BD standards, a disc complying with the DVD standards and a disc complying with the CD standards, the pickup apparatus needs to include light-receiving elements and laser units for emitting the laser beams to be cast on the different types of discs, respectively. This entails another problem of the increase in the number of parts needed for the optical pickup apparatus.

SUMMARY OF THE INVENTION

The present invention has been made with these problems taken into consideration. An object of the present invention is to provide an optical pickup apparatus using a reduced number of parts.

An optical pickup apparatus of the present invention includes: a first laser unit including a first light source for emitting a first laser beam; a second laser unit including a second light source for emitting a second laser beam whose wavelength is longer than that of the first laser beam, and a third light source for emitting a third laser beam whose wavelength is longer than those of the first and second laser beams; and an photo detecting device including a first photo detector for receiving the first and second laser beams, and a second photo detector for receiving the third laser beam, in which the first, second and third laser beams selectively emitted from the light sources of the first and second laser units are guided to a common optical path by a beam splitter, and are thus guided to various information recording media fit for the laser beams, wherein the first photo detector provided in the photo detecting device comprises: a first light receiving region for receiving a zero-order beam which is produced by diffracting one of the laser beams; a second light receiving region, located adjacent to the first light receiving region, for receiving a plus first-order beam which is produced by the diffraction; and a third light receiving region, located adjacent to the first light receiving region and opposed to the second light receiving region, for receiving a minus first-order beam which is produced by the diffraction, wherein a light-reception prohibiting area for rejecting reception of the laser beam is provided in a corner portion of each of the second and third light receiving regions, which is closer to the first light receiving region.

BRIEF DESCRIPTION OF THE DRAWINGS

FIG. 2A is a plan view showing the PDIC, and FIG. 2B is a cross-sectional view showing its multi-layered disc.

DESCRIPTION OF THE PREFERRED EMBODIMENTS

Figure 1:
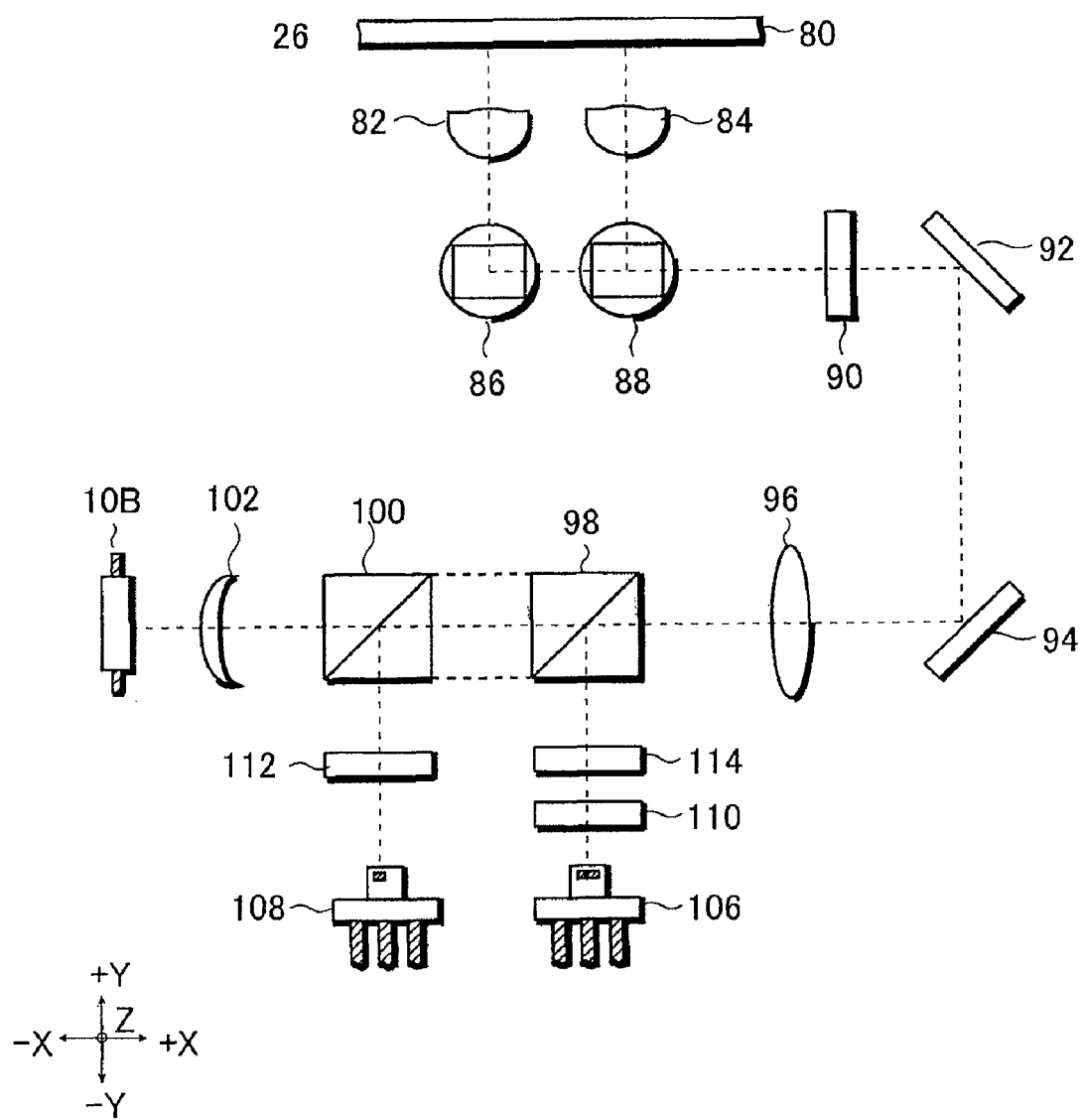
FIG. 1 is a diagram showing an optical layout of an optical pickup apparatus of the present invention.

Referring to FIG. 1, description is provided for a configuration of optical elements in an optical pickup apparatus 26 including a PDIC 10B.

The optical pickup apparatus 26 has a function of: focusing laser beams, which respectively comply with the BD (blu-ray disc) standards, the DVD (digital versatile disc) standards or the CD (compact disc) standards, on an information recording layer of an optical disc (an information recording medium); and receiving beams which are reflected off the information recording layer; and converting the reflecting beams into the respective electric signals.

The laser beams used by the optical pickup apparatus 26 are a laser beam (in a bluish violet wavelength range of 400 nm to 420 nm) complying with the BD standards; a laser beam (in a red wavelength range of 645 nm to 675 nm) complying with the DVD standards; and a laser beam (in an infrared wavelength range of 765 nm to 805 nm) complying with the CD standards.

With regard to its specific configuration, the optical pickup apparatus 26 includes: objective lens 82, 84; reflecting mirrors 86, 88; a quarter wavelength plate 90; reflector plates 92, 94; a collimator lens 96; prisms 98, 100; an anamorphic lens 102; a PDIC 10B; diffraction gratings 110, 112; laser units 106, 108; and a divergent lens 114.

The laser unit 108 is built as a package of a light-emitting element for emitting the laser beam to be cast on the disc 80 complying with the BD standards. In other words, the light-emitting element for emitting the laser beam complying with the BD standards is built in the laser unit 108.

The laser unit 106 is a package of a light-emitting element for emitting the laser beams to be cast on the disc 80 complying with the DVD standards and the CD standards. In other words, the light-emitting element including the two light-emitting sources for emitting the respective laser beams complying with these standards is built in the laser unit 106.

In this respect, each of the laser units 106, 108 may be what is termed as a CAN-type package or what is termed as a lead frame-type package.

The diffraction grating 110 has a function of separating each of the laser beams (DVD standards or the CD standards), which are emitted from the laser unit 106, into a zero-order diffracted beam, a plus first-order diffracted beam and a minus first-order diffracted beam.

The diffraction grating 112 has a function of separating the laser beam (BD standards), which is emitted from the laser unit 108, into a zero-order diffracted beam, a plus first-order diffracted beam and a minus first-order diffracted beam.

In this respect, a specific configuration of the diffraction grating 110 will be later described while referring to FIG. 5. The diffracted beams of the laser beam complying with the DVD standards or the CD standards, which are obtained by the diffraction by the diffraction grating 110, or the diffracted beams of the laser beam complying with the BD standards, which are obtained by the diffraction by the diffraction grating 112, are cast on the same signal track of the disc 80.

The divergent lens 114 has a function of adjusting a spread angle of the laser beam having been diffracted by the diffraction grating 110.

The anamorphic lens 102 is that for subjecting a laser beam, which is passing the anamorphic lens 102, to astigmatism for focus control.

Photo-diode integrated circuit elements for signal detection, which are configured to function as a photo detectors, are built in the PDIC 10B. The PDIC 10B receives the laser beam complying with the BD standards, the DVD standards or the CD standards, and generates light-reception outputs each including an information signal component. In addition, the PDIC 10B produces a servo signal component to be used for a focus servo operation and a tracking servo operation.

The prism 100 includes a plane of reflection having polarization selectivity with respect to the laser beam complying with the BD standards, which is emitted from the laser unit 108. The laser beam emitted from the laser unit 108, which is a linear polarization beam polarized in the S direction, is reflected in the +X direction by the plane of reflection in the prism 100. In addition, a return beam on its return trip, which results from the reflection off the disc 80, is turned into a linear polarization beam polarized in the P direction due to the effect of the quarter wavelength plate 90, and is transmitted through the plane of reflection in the prism 100 in the –X direction.

The prism 98 includes a plane of reflection having wavelength selectivity and polarization selectivity for the purpose of playing a role as a beam splitter for guiding the laser beam complying with the BD standards, the laser beam complying with the DVD standards and the laser beam complying with the CD standards to a common optical path. To put it specifically, the prism 98 transmits the laser beam complying with the BD standards, which is emitted from the laser unit 108, no matter what polarization direction the laser beam is directed in. On the other hand, the laser beam complying with the DVD standards and the laser beam complying with the CD standards, which are emitted from the laser unit 106, are reflected by or transmitted through the plane of reflection in the prism 98, depending on their respective polarization directions. To put it specifically, the laser beam complying with the DVD standards or the laser beam complying with the CD standards is emitted from the laser unit 106, and each laser beam is a linear polarization beam polarized in the S direction. The laser beam emitted from the laser unit 106 in the +Y direction is reflected in the +X direction by the plane of reflection in the prism 98, and thereafter reaches the disc 80 through the various optical elements. The laser beam, which is the return beam resulting from the reflection of the laser beam off the information recording layer of the disc 80, is converted to the linear polarization beam polarized in the P direction due to the effect of the quarter wavelength plate 90. Thus, this laser beam falls incident on the prism 98 in a direction opposite to the +X direction, and is transmitted through the plane of reflection in the prism 98 in the –X direction.

The collimator lens 96 is that for turning each of the laser beams emitted from the respective laser units 106, 108 into parallel rays.

The reflector plates 92, 94 are those for reflecting each of the laser beams emitted from the respective laser units 106, 108 in a predetermined direction. In this respect, the reflectance factor of each laser beam to be reflected by each of the reflector plates 92, 94 may be set at 100%. Otherwise, the reflectance factor of each laser beam in a particular wavelength and/or in a particular polarization direction may be adjusted in order to compensate for the functions of the prisms 98, 100.

The quarter wavelength plate 90 is an optical element for causing phase differences in the laser beams falling incident on the quarter wavelength plate 90. For this reason, once passing the quarter wavelength plate 90, the laser beams emitted from the laser units 106, 108, which are the linear polarization beams polarized in the S direction, are converted to laser beams which are circular polarization beams, respectively. Furthermore, once passing the quarter wavelength plate 90 again after reflected off the information recording layer of the disc 80, the laser beams constituting the circular polarization beams are converted to the laser beams which are the linear polarization beams polarized in the P direction.

The reflecting mirror 88 includes a plane of reflection having frequency selectivity. Accordingly, the reflecting mirror 88 reflects the laser beam complying with the DVD standards and the laser beam complying with CD standards in the +Y direction, and transmits the laser beam complying with the BD standards in the –X direction.

The reflecting mirror 86 reflects the laser beam complying with the BD standards, which has been transmitted through the reflecting mirror 88, in the +Y direction.

The objective lens 84 focuses the laser beams complying with the DVD standards and the CD standards, which have been reflected off the reflecting mirror 88, on the information recording layer of the disc 80.

The objective lens 82 focuses the laser beam complying with the BD standards, which has been reflected off the reflecting mirror 86, on the information recording layer of the disc 80.

Next, description will be provided for how the optical pickup apparatus 26 thus configured works. A reading operation and a writing operation are basically the same. A laser beam with a higher intensity is used for the writing operation than for the reading operation.

First of all, description will be provided for the optical path of the laser beam complying with the DVD standards and the laser beam complying with the CD standards. The laser beam emitted from the laser unit 106 is separated into the zero-order diffracted beam, the plus first-order diffracted beam and the minus first-order diffracted beam due to the diffraction effect of the diffraction grating 110. Thereafter, the resultant laser beam is made to have a predetermined spread angle by the divergent lens 114. In this respect, the laser beam emitted from the laser unit 106 is the linear polarization beam polarized in the S direction.

The laser beam thus separated is reflected by the plane of reflection in the prism 98, and is thereafter reflected by the reflector plates 94, 92, as well as subsequently passes the quarter wavelength plate. Thereby, the laser beam is converted from the linear polarization beam to the circular polarization beam.

Afterward, the laser beam having been converted to the circular polarization beam is reflected by the reflecting mirror 88, and is thereafter focused on the information recording layer of the disc 80 by the objective lens 84.

The laser beam, which is the return beam resulting from the reflection of the laser beam off the information recording layer of the disc 80, passes the objective lens 84, and is thereafter reflected by the reflecting mirror 88, as well as subsequently passes the quarter wavelength plate. Thereby, the laser beam once having been converted to the circular polarization beam is converted to the linear polarization beam polarized in the P direction.

The laser beam whose polarization direction has been thus changed is reflected by the reflector plates 92, 94, and afterward passes the collimator lens 96, as well as is subsequently transmitted through the prisms 98, 100. Thereafter, the resultant laser beam is subjected to astigmatism by the anamorphic lens 102, and afterward reaches the PDIC 10B.

The PDIC 10B reads information, and performs the focus servo operation and the tracking servo operation on the basis of the information thus read.

Next, description will be provided for the optical path of the laser beam complying with the BD standards.

First of all, the laser beam complying with the BD standards, which is the linear polarization beam polarized in the S direction, is emitted from the laser unit 108. The emitted laser beam complying with the BD standards is separated into the three polarization beams by the diffraction grating 112, and is subsequently reflected by the plane of reflection in the prism 100. The reflected laser beam is transmitted through the prism 98, and is thereafter converted to parallel rays by the collimator lens 96, as well as is afterward reflected by the reflector plates 94, 92, subsequently reaching the quarter wavelength plate 90.

The laser beam, which has been converted from the linear polarization beam to the circular polarization beam by the quarter wavelength plate 90, is transmitted through the reflecting mirror 88, and is afterward reflected in the +Y direction by the plane of reflection in the reflecting mirror 86. The resultant laser beam is focused on the information recording layer of the disc 80 by the objective lens 82.

The laser beam, which is a return beam resulting from the reflection of the laser beam off the information recording layer of the disc 80, passes the objective lens 82, and is subsequently reflected by the reflecting mirror 86, as well as is thereafter transmitted through the reflecting mirror 88, afterward falling incident on the quarter wavelength plate 90. The quarter wavelength plate 90 converts the laser beam from the circular polarization beam to the linear polarization beam polarized in the P direction. After that, the laser beam, which is the linear polarization beam polarized in the P direction, is reflected by the reflector plates 92, 94, and is transmitted through the collimator lens 96, subsequently reaching the prism 98.

The laser beam complying with the BD standards, which is the linear polarization beam polarized in the P direction, is transmitted through the prisms 98, 100, and is subsequently submitted to astigmatism by the anamorphic lens 102, as well as is afterward cast on the PDIC 10B. The PDIC 10B reads information, and performs a focus servo operation and a tracking servo operation on the basis of the read information.

As described above, this embodiment makes the optical elements shared among the multiple laser beams through the scheme in which: the laser beam complying with the BD standards is emitted from the laser unit 108; the laser beam complying with the DVD standards and the laser beam complying with the CD standards are emitted from the laser unit 106; and these laser beams are guided to the common optical path by the beam splitter. To put it specifically, the PDIC 10B, the anamorphic lens 102, the collimator lens 96, the reflector plates 94, 92 and the quarter wavelength plate 90 are shared among the three types of laser beams. This makes it possible to reduce the number of needed parts, and accordingly to simplify the configuration of the optical pickup apparatus 26.

Figure 2:
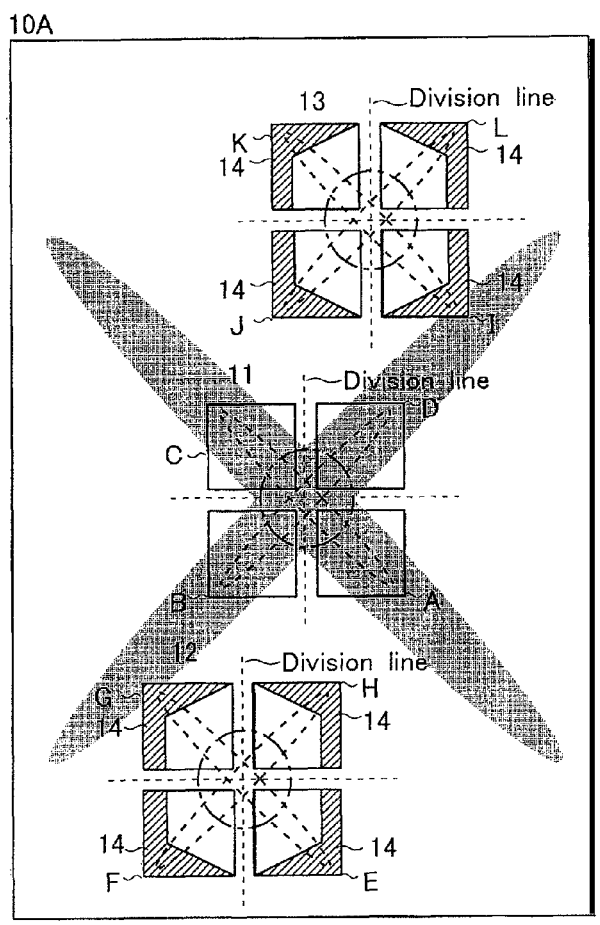
FIGS. 2A and 2B are diagrams showing a PDIC (photo detecting device) included in the optical pickup apparatus of the present invention.
Figure 2:
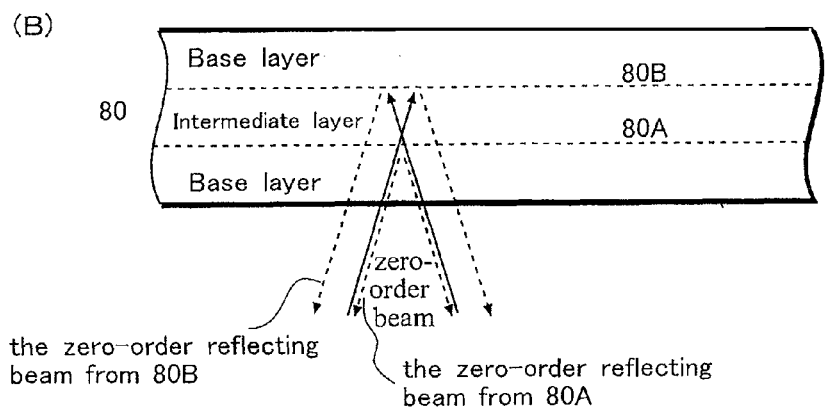

Referring to FIG. 2, descriptions will be provided for a configuration of a PDIC 10A (the photo detecting device) included in the optical pickup apparatus of this embodiment.

FIG. 2A is a plan view showing the PDIC 10A, and FIG. 2B is a cross-sectional view showing the multi-layered disc 80.

Referring to FIG. 2A, the PDIC 10A has three light receiving regions, which are a first light receiving region 11, a second light receiving region 12 and a third receiving region 13. These three light receiving regions respectively receive the three diffracted beams resulting from the diffraction of the laser beam, and produce a control signal to carry out a differential astigmatism method. To put it specifically, the zero-order diffracted beam resulting from the diffraction is received by the first light receiving region 11; the plus first-order diffracted beam resulting from the diffraction is received by the second light receiving region 12; and the minus first-order diffracted beam resulting from the diffraction is received by the third light receiving region 13.

Referring to FIG. 2B, descriptions will be provided for a case where information is read from and written to the multi-layered disc 80 (the information recording medium) having a first information recording layer 80A and a second information recording layer 80B. The disc 80 has a constitution in which a base layer having the first information recording layer 80A and the other base layer having the second information recording layer 80B are stacked together with an intermediate layer interposed in between. The first information recording layer 80A is formed from a translucent film, and has a characteristic in which: part of the cast laser beam is transmitted through the first information recording layer 80A; and the rest of the cast laser beam is reflected by the first information recording layer 80A. On the other hand, the second information recording layer 80B is formed from a reflecting film, and reflects the cast laser beam. In this respect, the description is given of the reading operation and the writing operation performed on the first information recording layer 80A. Although the disc 80 including the two information recording layers is shown here, multiple information recording layers, including three or more layers, may be provided to the disc 80.

It should be noted that the three light receiving regions are not vertically arranged in a straight line, but are arranged in a way that makes some receiving regions slightly deviate from a vertical straight line in the horizontal direction on the drawing. This deviation results from the influence of the anamorphic lens 102 placed immediately near the PDIC 10A. To put it specifically, the first light receiving region 11 is placed in a location in which the zero-order reflecting beam, which has been subjected to astigmatism by the anamorphic lens 102, forms its least circle of confusion when the zero-order beam is focused on the first information recoding layer 80A. In other words, because the arrangement of the first light receiving region 11, the second light receiving regions 12 and the third light receiving regions 13 is rotated due to the influence of the anamorphic lens, the first light receiving region 11, the second light receiving regions 12 and the third light receiving regions 13 are resultantly arranged obliquely in a way that makes one lateral side (extending in the vertical direction in the drawing) of a light receiving region is shifted from the extension of the corresponding lateral side of the next receiving region.

FIG. 2A indicates the least circle of confusion with a circle which is drawn with a chain line. In addition, the second light receiving region 12 is placed in a location in which the plus first-order reflecting beam forms its least circle of confusion when the plus first-order beam is similarly focused on the first information recording layer 80A. Furthermore, the third light receiving region 13 is placed in a location in which the minus first-order reflecting beam forms its least circle of confusion when the minus first-order beam is similarly focused on the first information recording layer 80A.

Each of these light receiving regions includes four light receiving portions into which the light receiving region is divided. To put it specifically, the first light receiving region 11 includes light receiving portions A, B, C, D; the second light receiving region 12 includes light receiving portions E, F, G, H; and the third light receiving region 13 includes light receiving portions I, J, K, L. Once a laser beam is cast on any of these light receiving portions, an output is obtained from the light receiving portion in accordance with the intensity of the cast laser beam. In the drawing, the division lines by which the each light receiving region is divided into the light receiving portions are indicated with the respective thin dotted lines.

In addition, because the focus of the laser beam is away from the first information recording layer 80A, each light receiving region is divided in a direction of 45 degrees to each direction in which the light reception pattern is shaped like an ellipse. In FIG. 2A, the light reception patterns, which are shaped like an ellipse, is marked with dashed lines. For example, in the first light receiving region 11 placed in the center, the light reception pattern of the zero-order beam is shaped like an ellipse: whose maximum-length line consists of the diagonal of the light receiving portion A and the diagonal of the light receiving portion C; and which changes it shape along these diagonals. Otherwise, the light reception pattern of the zero-order beam is shaped like an ellipse: whose maximum-length line consists of the diagonal of the light receiving portion B and the diagonal of the light receiving portion D; and which changes its shape along these diagonals.

Which kind of ellipse the light reception pattern is shaped like is determined on the basis of a direction in which the focus of the laser beam deviates. To put it specifically, in a case where the focus of the zero-order beam is located beyond the objective lens, but short of the first information recording layer 80A (in the lower side in FIG. 2B), the light reception pattern is shaped like an ellipse descending obliquely leftward. On the other hand, in a case where the focus of the zero-order beam is located above the first information recording layer 80A, the light reception pattern is shaped like an ellipse descending obliquely rightward.

In this embodiment, each of the second light receiving region 12 and the third light receiving region 13 for receiving the first-order diffracted beams is provided with a light-reception prohibiting area 14 for prohibiting the reception of the laser beam. Referring to the second light receiving region 12, the light-reception prohibiting area 14 is provided in a corner which is away from the division lines of the first light receiving region 11. In the drawing, the light-reception prohibiting area 14 is provided in the upper left corner of the second light receiving region 12.

Similarly, referring to the third light receiving region 13, the light-reception prohibiting area 14 is provided in a corner (lower right corner) of the third light receiving region 13, which is away from the division lines of the first light receiving region 11.

Each light-reception prohibiting area 14 may be provided by use of a mask made of a metal film, such as an aluminum film, which is used in foaming the light receiving portions A to L. Alternatively, each light-reception prohibiting area 14 may be provided by protecting the light-reception prohibiting area 14 by use of a covering film made of a material which is different from the material of a protective film used in forming the light-receiving portions A to L. Otherwise, each light-reception prohibiting area 14 may be formed by cutting off part of the second light receiving region 12 and part of the third light receiving region 13.

By this, while the laser beam (the zero-order beam) is focused on one information recording layer (for example, the first information recording layer 80A), the servo system is prevented from malfunctioning due to the casting, on the PDIC 10A, of stray light which is the zero-order beam of the laser beam reflected off the other information recording layer (for example, the second information recording layer 80B). To put it specifically, referring to FIG. 2B, when a focus jump is performed for the purpose of changing a layer for a reading operation or a writing operation from the first information recording layer 80A to the second information recording layer 80B, stray light reflected off the second information recording layer 80B is cast on the corresponding hatched areas in FIG. 2A. As a result, the stray light is cast on the light receiving portion G of the second light receiving region and the light receiving portion I of the third light receiving region. If no countermeasure would be taken against the stray light, no appropriate servo system would be provided because outputs from the light receiving portion G and the light receiving portion I become larger than outputs from the other receiving portions.

To solve this problem, this embodiment provides the light receiving portion G and the light receiving portion I, which are included in the light receiving regions, with the light-reception prohibiting areas 14 for prohibiting the light reception by covering the parts of the portions, respectively. This prohibits the stay light from reaching these light receiving portions (light receiving region), and accordingly prevents the malfunction of the servo system which would occur due to the casting of the stray light.

In this respect, the stray light, which is hatched, is cast in a way that the upper left end portion of the second light receiving region 12 and the lower right end portion of the third light receiving region 13 are included. Because, however, the stray light may be cast on the upper right end portion (the light receiving portion H) of the second light receiving region 12 and the lower left end portion (the light receiving portion J) of the third light receiving region 13 depending on the layout of the light receiving regions, the light-reception prohibiting areas 14 are placed in the corresponding corner portions of these regions, respectively.

Furthermore, in the second light receiving region 12, the light-reception prohibiting areas 14 are arranged bilaterally symmetrical with respect to the vertical division line in the drawing. In other words, the light-reception prohibiting area 14 is placed in not only the upper left corner portion but also the upper right corner portion. This makes the light quantity and output value of cast laser beam equal among the light receiving portions when the light reception pattern is shaped like any one of the ellipses indicated with the dashed lines. This is the case with the third light receiving region 13 as well.

Moreover, in the second light receiving region 12, the light-reception prohibiting areas 14 are placed in not only the respective corner portions closer to the first light receiving region 11. Rather, the light-reception prohibiting areas 14 are placed in all the four corner portions, respectively. This makes the light quantity and output value of cast laser beam equal between each two opposed light receiving portions when the light reception pattern is shaped like any one of the ellipses indicated with the dashed lines. To put it specifically, the light quantity and output value of cast laser beam become equal between the light receiving portion E and the light receiving portion G which are included in the second light receiving region 12. In addition, the light quantity and output value of cast laser beam become equal between the light receiving portion F and the light receiving portion H. This is the case with the third light receiving region 13 as well.

Besides, the light-reception prohibiting area 14 may be provided not only in the corner portions of each of the light receiving regions on which the respective first-order beams are cast, but also near the left and right lateral sides of the light receiving region in the drawing. To put it specifically, referring to the light receiving portion E in the second light receiving region 12, the light-reception prohibiting area 14 is continuously placed near the lower right corner portion and near the right lateral side in the drawing. Similarly, referring to the light receiving portion F, the light-reception prohibiting area 14 is continuously placed near the lower left corner portion and near the left lateral side. Furthermore, the light-reception prohibiting area 14 is continuously placed near the upper left corner portion and near the left lateral side in the light receiving portion G. Moreover, the light-reception prohibiting area 14 is continuously placed near the upper right corner portion and near the right lateral side in the light receiving portion H. This is the case with the third light receiving region 13 as well.

Because, as described above, the light-reception prohibiting area 14 is provided near each lateral side of each of the second light receiving region 12 and the third light receiving region 13 on which the respective first-order beams are cast, the stray light is inhibited from causing trouble in the servo system even if the stray light is cast on the lateral sides of each light receiving region.

This embodiment employs a differential push-pull method as the tracking control method, and the differential astigmatism method as the focus control method.

An FE (focus error) signal for the differential push-pull method is acquired as follows. Arithmetic is performed on a main push-pull signal which is a differential signal between a sum signal representing the sum of light-reception outputs in one of two segments and the other sum signal representing the sum of light-reception outputs in the other of the two segments, the two segments obtained by diving the first light receiving region 11, as the main light receiving region, by its division line extending in the direction of the signal track. For the second light receiving region 12 and the third light receiving region 13 as the sub light receiving regions, arithmetic is performed on a first sub push-pull signal and a second sub push-pull signal, respectively. The first sub push-pull signal is a differential signal between a sum signal representing the sum of light-reception outputs in one of two segments and the other sum signal representing the sum of light-reception outputs in the other of the two segments, the two segments obtained by diving the second light receiving region 12 by its division line extending in the direction of the signal track. The second sub push-pull signal is a differential signal between a sum signal representing the sum of light-reception outputs in one of two segments and the other sum signal representing the sum of light-reception outputs in the other of the two segments, the two segments obtained by diving the third light receiving region 13 by its division line extending in the direction of the signal track. Subsequently, arithmetic is performed on the differential among these push-pull signals by: applying gain control (k1) to a combination of the main push-pull signal with a composite signal which is obtained by combining the first and second sub push-pull signals.

To put it specifically, the FE signal for the differential push-pull method is calculated with the following mathematical expression:

$$A+B-C-D-k1(E+F-G-H+I+J-K-L)$$

where the reference signs denote the outputs acquired from the light receiving portions, respectively. In this case, each light receiving region is divided into the four light receiving portions whose arrangement is two squares by two squares. Instead, even when the light receiving region is bisected into upper and lower halves in the drawing, arithmetic can be performed on push-pull signals on the basis of the outputs from each light receiving region.

On the other hand, the FE signal for the differential astigmatism method is calculated on the basis of the outputs from the respective light receiving portions by performing arithmetic on the mathematical expression:

$$\{(A+C)-(B+D)\}+k2[\{(I+K)-(J+L)\}+\{(E+G)-(F+H)\}]$$

where k2 represents a ratio of the light intensity of the zero-order beam to the light intensity of the plus/minus first-order beams.

Figure 3:
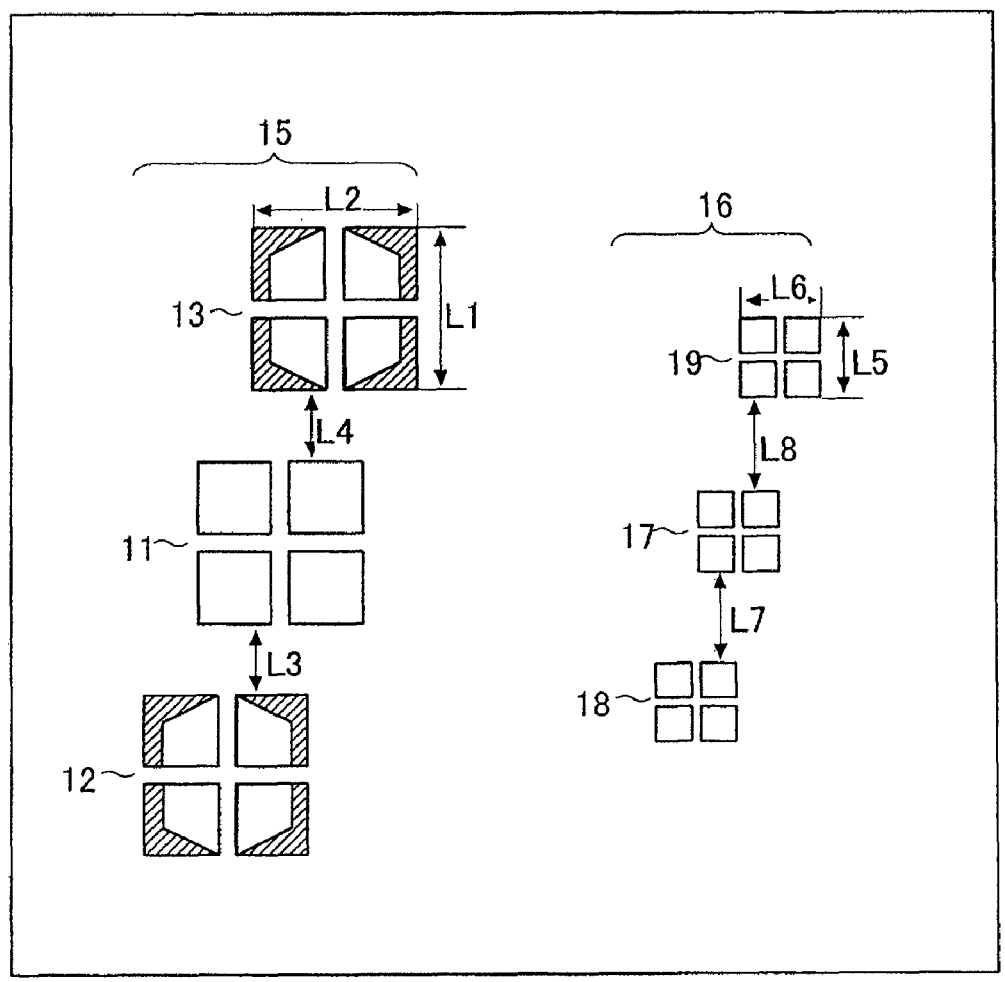
FIG. 3 is a plan view showing part of a PDIC of a different embodiment of the present invention.
Figure 4:
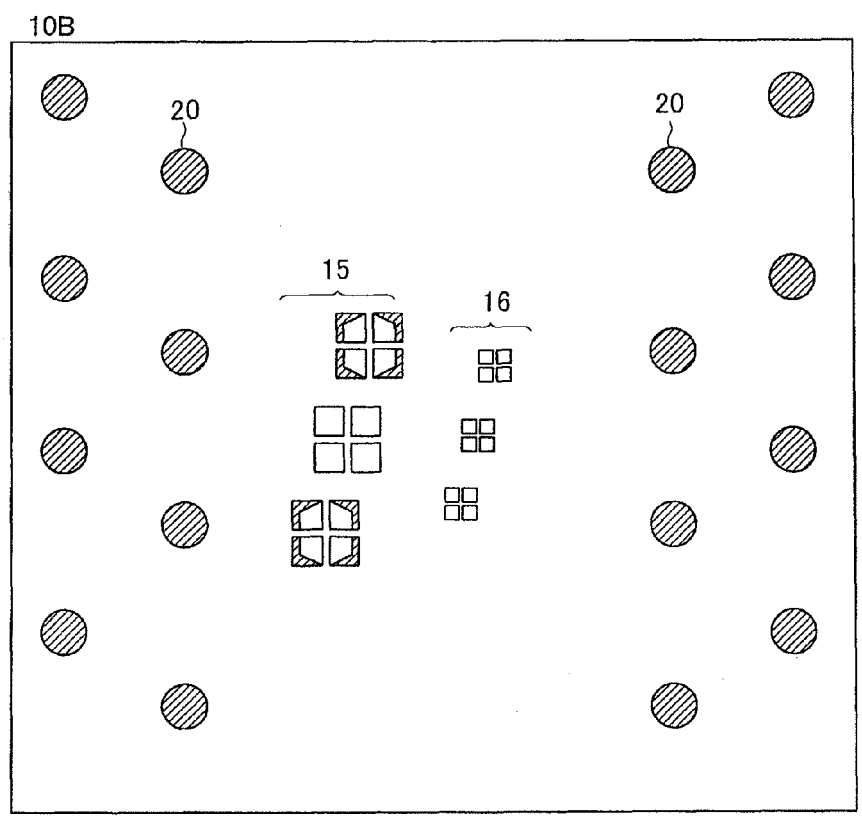
FIG. 4 is a plan view showing an entirety of the PDIC of the different embodiment of the present invention.

Referring to the plan view in FIG. 3 and the plan view in FIG. 4, description will be provided for the embodied PDIC 10B. FIG. 3 is a plan view showing part of the PDIC 10B in which photo detectors are provided, and FIG. 4 is a plan view showing an entirety of the PDIC 10B.

Referring to FIG. 3, as a first photo detector 15, the light receiving regions shown in FIG. 2 are incorporated in the PPDIC 10B. In addition, a second photo detector 16 for detecting a laser beam whose wavelength is different from a wavelength which the first photo detector 15 handles is placed next to the first photo detector 15. Signals are read, as well as the focus servo operation and the tracking servo operation are carried out, by receiving the diffracted laser beams by use of these photo detectors.

The first photo detector 15 includes the first light receiving region 11, the second light receiving region 12 and the third light receiving region 13, which have been described by use of FIG. 2. In this embodiment, the first photo detector 15 is configured to detect the laser beam complying with the BD standards and the laser beam complying with the DVD standards.

The second photo detector 16 includes: a first light receiving region 17 for receiving the diffracted zero-order beam; a second light receiving region 18 for receiving the diffracted plus first-order beam; and a third light receiving region 19 for receiving the diffracted minus first-order beam. In addition, each light receiving region included in the second photo detector 16 is formed from four light receiving portions into which the light receiving region 16 is divided, and whose arrangement is two squares by two squares. A servo system is operated in the second photo detector 16 in accordance with the same principle as the servo system is operated in the first photo detector 15. In this embodiment, the laser beam complying with the CD standards is cast on the second photo detector 16.

It should be noted that none of the light-reception prohibiting areas 14, which are shown in FIG. 2 is provided in the light receiving portions of the second photo detector 16. The reason for this is that: the disc complying with the CD standards, from which information is read by the second photo detector 16, has only a single information recording layer; and accordingly, the foregoing stray light is not cast on the second photo detector 16.

The light receiving regions included in the first photo detector 15 are formed larger than those included in the second photo detector 16 when viewed in the plan view. To put it specifically, the third light receiving region 13 included in the first photo detector 15 is shaped like a square whose sides (L1, L2) is approximately 100 μm in length, while the third light receiving portion 19 included in the second photo detector 16 is shaped like a square whose sides (L5, L6) are approximately 80 µm in length.

The reason why the first photo detector 15 is formed in this larger size is as follows. For example, when the focus servo operation and the tracking servo operation are performed with the laser beam, which complies with the BD standards, directly cast on the PDIC 10B, it is likely that: the FE signal may change sharply in accordance with the change in the cast laser beam; and the servo system accordingly may fail to operate appropriately. With this likelihood taken into consideration, this embodiment amplifies the laser beam by use of the optical elements incorporated in the optical pickup apparatus, and receives the resultant laser beam by use of the larger light receiving regions. This alleviates the change in the FE signal which occurs due to the change in the light reception pattern of the laser beam, and enables the servo system to be operated appropriately.

Because the area of each light receiving region of the first photo detector 15 is increased, it is more likely that the stray light as shown in FIG. 2A may be cast on the second light receiving region 12 and the third light receiving region 13 which are placed in the two opposite ends of the first photo detector 15. This embodiment precludes the problem, which occurs in conjunction with the stray light, by providing the second light receiving region 12 and the third light receiving region 13 with the light-reception prohibiting areas 14.

Furthermore, the distance with which each neighboring two of the light receiving regions included in the first photo detector 15 are spaced out is set shorter than the distance with which each neighboring two of the light receiving regions included in the second photo detector 16 are spaced out. To put it specifically, the distance L3 with which the first light receiving region 11 and the second light receiving region 12 are spaced out in the first photo detector 15 is approximately 50 µm, for example. Similarly, the distance L4 with which the first light receiving region 11 and the third light receiving region 13 are spaced out in the first photo detector 15 is approximately 50 µm. On the other hand, the distance L7 with which the first light receiving region 17 and the second light receiving region 18 is spaced out in the second photo detector 16 is approximately 40 µm. Similarly, the distance L8 with which the first light receiving region 17 and the third light receiving region 19 are spaced out in the second photo detector 16 is approximately 40 µm.

As a result of the increase in the area of each light receiving region included in the first photo detector 15, the light receiving regions are close to one another. Thereby, part of the second light receiving region 12 and part of the third light receiving region 13, on both of which the stray light shown in FIG. 2 is cast, may increase in area. However, this embodiment solves the problem, which occurs in conjunction with the stray light, by the provision of the light-reception prohibiting areas 14 described above.

Moreover, the light receiving regions included in the first photo detector 15 have the same area among them, while the light receiving regions included in the second photo detector 16 have the same area among them.

Referring to FIG. 4, the first photo detector 15 and the second photo detector 16 are placed near the center of the semiconductor substrate. Connection terminals 20 connected to these detectors are placed in the peripheral portions of the substrate. In addition, an adder, a subtracter, an amplifier and the like for processing signals outputted from the photo detectors are placed in the FDIC 10B. Each of the first photo detector 15 and the second photo detector 16 generates a photoelectric conversion signals on the basis of the amount of light to be received. An error signal which is produced by the adder and the like on the basis of this photoelectric conversion signal is supplied to the outside via the connection terminals 20.

Figure 5:
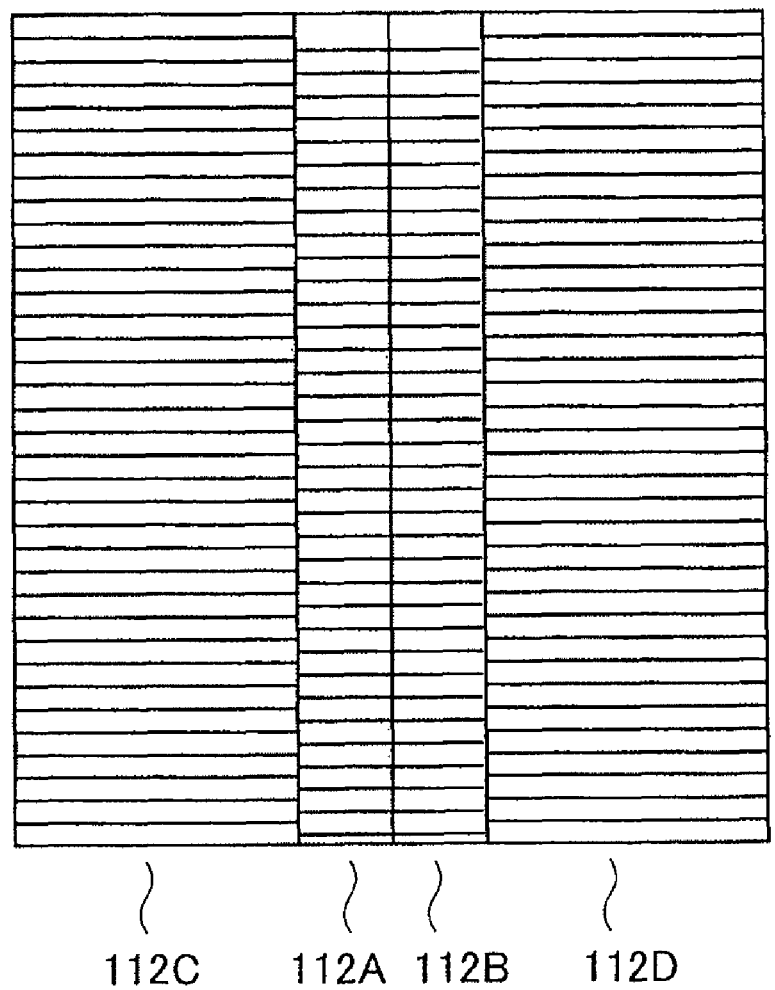
FIG. 5 is a diagram showing a diffraction grating included in the optical pickup apparatus of the present invention.

FIG. 5 is an explanatory diagram schematically showing a plan configuration of the diffraction grating 112 for diffracting the laser beam complying with the BD standards. The diffraction grating 112 is divided into four regions in the direction of the signal track of the optical disc. Each of outer regions 112C, 112D, between which two center regions 112A, 112B intervene, is that configured to shift the phase of the laser beam, which the laser beam passes, by a π radian. Furthermore, in the diffraction grating 112, the center region 112A, 112B are those set up in a way that: the phase shift produced between the center region 112A and its contiguous outer region 112C, the phase shift produced between the contiguous center regions 112A, 112B, as well as the phase shift produced between the center region 112B and its contiguous outer region 112D are equal to or less than a π radian which is equal to the phase shift produced between the outer regions 112C, 112D. For example, the diffraction grating 112 is set up in a way that: the phase shift produced between one outer region 112C and its contiguous center region 112A is a π/2 radian; the phase shift produced between the other outer region 112D and its contiguous center region 112B is a π/2 radian; and the phase shift produced between the center regions 112A, 112B is a π radian.

The grating shape of the diffraction grating 112 is a simple up-and-down shape in which, for example, grooves are formed in a white glass plate at predetermined pitches. The height of the grooves in the grating is appropriately set up in order that the ratio among the zero-order diffracted beam, the plus first-order diffracted beam and the minus first-order diffracted beam, into which any of laser beams within the wavelength complying with the BD standards is separated, can simultaneously satisfy both the tracking servo operation and the signal reproducing characteristic or the signal recording characteristic.

The laser beam complying with the BD standards, which is emitted from the laser unit 108 shown in FIG. 1, is diffracted by the diffraction grating 112. Thereby, the phase of the laser beam is shifted by a π radian, as well as concurrently, the laser beam is separated into the zero-order diffracted beam, the plus first-order diffracted beam and the minus first-order diffracted beam. Thus, these three beams are cast on the optical disc while placed in a row on the same signal track.

Referring to FIG. 1 again, the structure of the diffraction grating 110 for diffracting the laser beam complying with the DVD standards and the laser beam complying with the CD standards is the same as that of the diffraction grating 112. For this reason, the laser beam complying with the DVD standards and the laser beam complying with CD standards, which are emitted from the laser unit 106, are diffracted by the diffraction grating 110. Thereby, each of the phase of the laser beam complying with the DVD standards and the phase of the laser beam complying with the CD standards is shifted by a π radian, as well as concurrently, the laser beam is separated into the zero-order diffracted beam, the plus first-order diffracted beam and the minus first-order diffracted beam. Thus, these three beams are cast on the optical disc while placed in a row on the same signal track.

Figure 6:
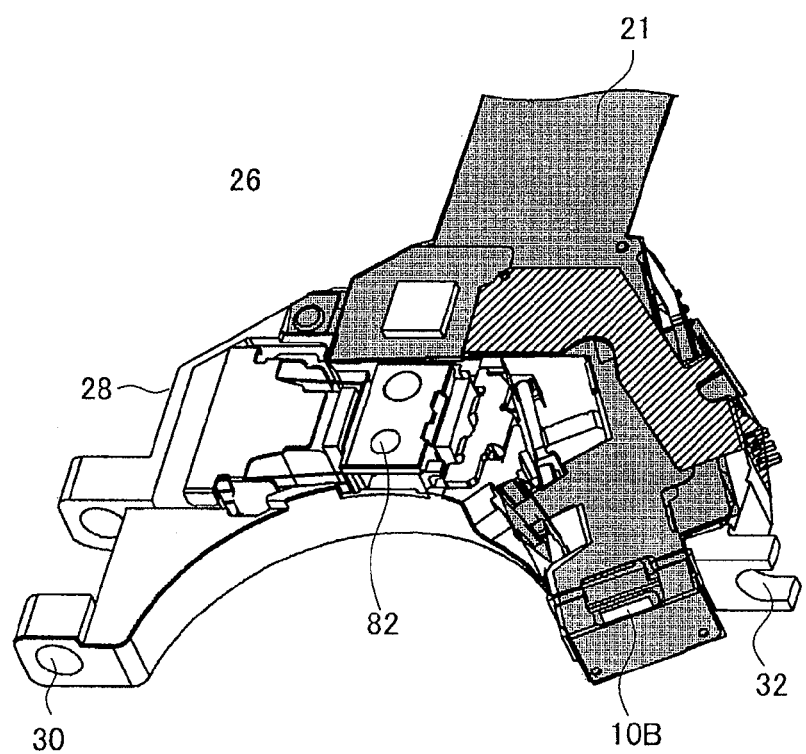
FIG. 6 is a perspective view showing an external appearance of the optical pickup apparatus of the present invention.
Figure 7:
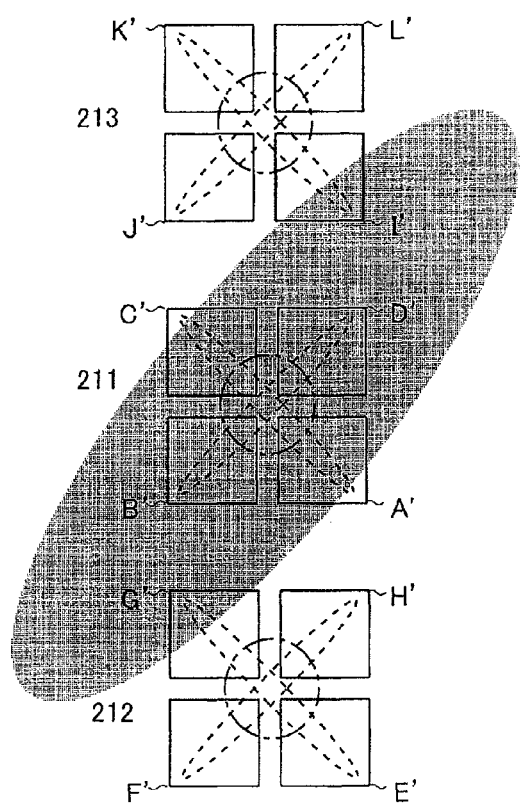
FIG. 7A is a plan view showing a PDIC of the prior art.
FIG. 7B is a cross-sectional view of its disc.
Figure 7:
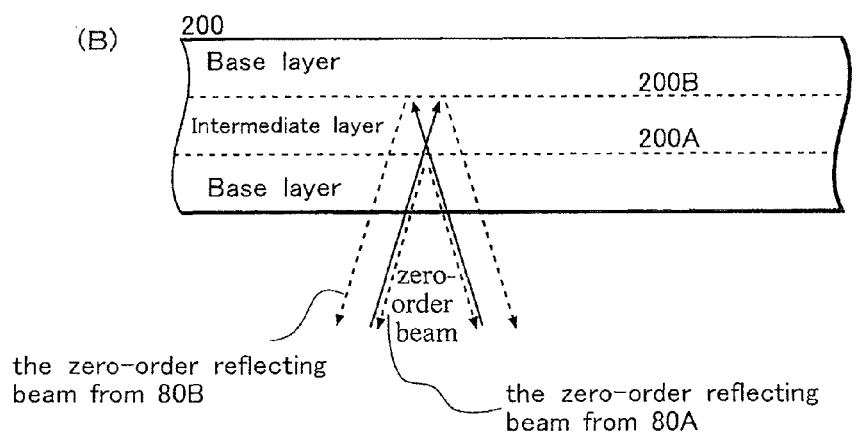

Referring to the perspective view shown in FIG. 6, description will be further provided for the optical pickup apparatus 26 into which the PDIC having the above-described configuration is incorporated.

The optical pickup apparatus 26 includes: a housing 28 made from a resin material or a metal material; the various optical elements housed in this housing 28; and a flexible wiring substrate 21 electrically connected to the optical elements.

An actuator which holds the objective lens 82 movably is placed on the top surface of the housing 28. In addition, the various optical elements are placed in the inside of and on the lateral sides of the housing 28.

The housing 28 is made from the resin material or the metal material (for example, magnesium) formed integrally by injection molding. In addition, a guide hole 30 and a guide groove 32 are respectively provided in the two end portions of the housing 28. Under the use condition, a guide shaft is inserted in the guide hole 30, while the other guide shaft is engaged with the guide groove 32. Thus, the optical pickup apparatus 26 moves along these guide shafts in the direction of the diameter of the disc.

The flexible wiring substrate 21 connects the optical elements included in the optical pickup apparatus 26 and the outside together. Furthermore, the flexible wiring substrate 21 has a function of electrically connecting the optical elements included in the housing 28 together.

The PDIC 10B is fixedly attached to a lateral surface of the housing 28 from the outside with the flexible wiring substrate 21 connected to the PDIC 10B.

The present invention makes the single photo detector, which is provided in the photo detecting device, detect the first laser beam, the second laser beam and the third laser beam, which are different from one another in wavelength. This makes it possible to reduce the number of parts needed for the optical pickup apparatus configured to perform a reading operation and the like on discs complying with the multiple standards, and accordingly to reduce the costs of the optical pickup apparatus.

Furthermore, the present invention provides the first, second and third light receiving regions configured to receive the respective zero-order, plus first-order, and minus first-order beams. In addition, the present invention provides the light-reception prohibiting area for prohibiting the reception of the laser beam in the corner portion of each of the second and third light receiving regions, which is adjacent to the first light receiving region.

This inhibits a reflecting beam (stray light) coming off one of the information recording layers, which is not a target of a reading operation or a writing operation, from being cast on the second and third light receiving regions, as well as accordingly enables the focus servo operation to be appropriately performed by the differential astigmatism method.

What is claimed is:

1. An optical pickup apparatus including: a first laser unit including a first light source for emitting a first laser beam; a second laser unit including a second light source for emitting a second laser beam whose wavelength is longer than that of the first laser beam, and a third light source for emitting a third laser beam whose wavelength is longer than those of the first and second laser beams; and a photo detecting device including a first photo detector for receiving the first and second laser beams, and a second photo detector for receiving the third laser beam, in which the first, second and third laser beams selectively emitted from the light sources of the first and second laser units are guided to a common optical path by a beam splitter, and are thus guided to various information recording media fit for the laser beams, wherein the first photo detector provided in the photo detecting device comprises:

a first light receiving region for receiving a zero-order beam which is produced by diffracting one of the laser beams;

a second light receiving region, located adjacent to the first light receiving region, for receiving a plus first-order beam which is produced by the diffraction; and a third light receiving region, located adjacent to the first light receiving region and opposed to the second light receiving region, for receiving a minus first-order beam which is produced by the diffraction, wherein a light-reception prohibiting area for rejecting reception of the laser beam is provided in a corner portion of each of the second and third light receiving regions, which is closer to the first light receiving region.

2. The optical pickup apparatus of claim 1, further comprising:

a first diffraction grating for diffracting the first laser beam to produce the zero-order beam, the plus first-order beam and the minus first-order beam, the first diffraction grating including at least two regions for shifting a phase of the laser beam passing through the first diffraction grating by $\pi$ radians; and a second diffraction grating for diffracting each of the second and third laser beams to produce the zero-order beam, the plus first-order beam and the minus first-order beam, the second diffracting grating including at least two regions for shifting a phase of the laser beam passing through the second diffraction grating by $\pi$ radians, wherein the zero-order, plus first-order and minus first-order beams of any one of the first, second and third laser beams are cast on the same track of the corresponding one of the information recording media, each of the first, second and third light receiving regions of the first photo detector is divided into at least two portions in order to produce a push-pull signal for tracking control from each of the first, second and third light receiving regions, each of the first, second and third light receiving regions of the second photo detector is divided into at least two portions in order to produce a push-pull signal for tracking control from each of the first, second and third light receiving regions, and the first laser and second laser beams are received by the first photo detector with optical axes of the respective first and second laser beams made to coincide with each other, while the third laser beam is received by the second photo detector.

3. The optical pickup apparatus of claim 1, further comprising an optical element, placed short of the photo detecting device, for subjecting the laser beam, which is to be received by the photo detecting device, to astigmatism for focus control, wherein the first, second and third light receiving regions of each of the first and second photo detectors are arrayed obliquely with respect to corresponding lateral sides of the respective first, second and third light receiving regions in accordance with the rotation of the arrangement of the zero-order, plus first-order and minus first-order beams of any one of the first, second and third laser beams by use of the optical element, and the light-reception prohibiting area for rejecting the reception of the laser beam is provided in a corner portion of each of the second and third light receiving regions, which is away from a center line of the first light receiving region.

4. The optical pickup apparatus of claim 3, wherein
in each of the second and third light receiving regions, the light-reception prohibiting areas are placed bilaterally symmetrical with respect to a division line of the light receiving region.

5. The optical pickup apparatus of claim 3, wherein
the first, second and third light receiving regions receive a reflecting beam which is reflected off any one of a plurality of information recording layers included in any one of the information recording media, and
the light-reception prohibiting area is provided in areas in each of the second and third light receiving regions, on which stray light is cast, the stray light being a reflecting beam reflected off the information recording layer on which the zero-order beam is out of focus.

6. The optical pickup apparatus of claim 3, wherein
the light-reception prohibiting area is provided in four corner of each of the second and third light receiving regions.

7. The optical pickup apparatus of claim 3, wherein
the light-reception prohibiting area is provided by masking part of each of the second and third light receiving regions.

8. The optical pickup apparatus of claim 3, wherein
the light-reception prohibiting area is provided by cutting out part of each of the second and third light receiving regions.

9. The optical pickup apparatus of claim 3, wherein
each of the light receiving regions included in the first photo detector is formed larger than each of the light receiving regions included in the second photo detector, when viewed in a plan view.

10. The optical pickup apparatus of claim 3, wherein
a distance with which the light receiving regions included in the first photo detector are spaced out is shorter than a distance with which the light receiving regions included in the second photo detector are spaced out.

11. The optical pickup apparatus of claim 3, wherein
the first photo detector detects the laser beam reflected off the information recording medium including a plurality of information recording layers, and
the second photo detector detects the laser beam reflected off the information recording medium including one information recording layer.

* * * * *